March 16, 1954    E. W. FISHER, JR., ET AL    2,672,359
SEALING DEVICE
Filed Sept. 22, 1950
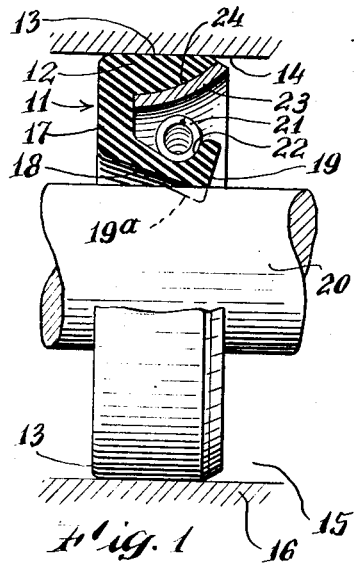
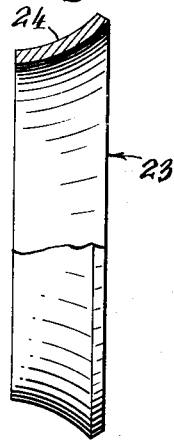
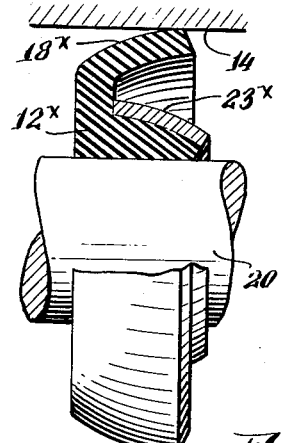
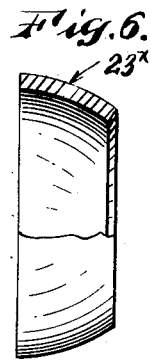
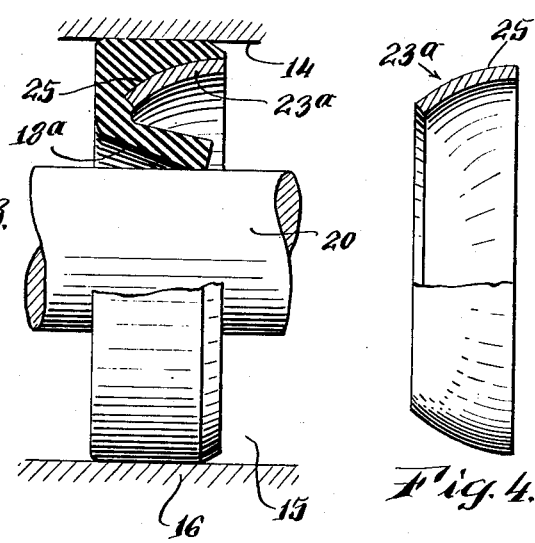
INVENTORS.
Edward W. Fisher, Jr.
BY Albert M. Chambers, Jr.
Fraser, Myers & Manley.
ATTORNEYS.

Patented Mar. 16, 1954

2,672,359

UNITED STATES PATENT OFFICE 2,672,359

SEALING DEVICE

Edward W. Fisher, Jr., and Albert M. Chambers, Jr., Palmyra, N. Y., assignors to The Garlock Packing Company, Palmyra, N. Y., a corporation of New York Application September 22, 1950, Serial No. 186,196

3 Claims. (Cl. 288—2)

This invention relates to sealing devices which are employed to seal an annular space between inner and outer machine elements which are movable relatively to each other, as, for example, between a shaft and an opening in a machine casing through which the shaft extends. Such sealing devices are commonly employed to prevent the passage or leakage of fluid lubricant outwardly along the shaft from a machine casing or of dust or other foreign matter along the shaft into such a casing.

This invention, more particularly, relates to improvements in a type of seal having a portion of relatively soft, resilient, molded rubber or rubber-like material (hereinafter referred to for convenience merely as "rubber"), which may frictionally engage a cylindrical surface of the machine element in or on which the device is to be mounted and having also a rigid annular member which functions as a pressure reaction member to squeeze such rubber portion radially between said reaction member and the surface of the machine element with which the sealing device is to be fixedly associated.

Sealing devices of this type may be easily pushed into place on or into a machine element and because of the fact that the mentioned rubber portion is squeezed radially into tight, frictional engagement with said element, the sealing device is held firmly in place against unintended dislodgment.

It has heretofore been proposed to make such a sealing device with a reaction ring which is generally cylindrical in shape. In that arrangement, the rubber which would lie between the reaction ring and an adjacent cylindrical surface of a machine element, would also be substantially cylindrical in shape; and ordinarily, because of the small dimensions of the annular space existing between two such machine elements, the said rubber would have to be quite thin in radial dimension. Such a thin body of rubber would yield little or no cushioning effect, but on the contrary would provide a very rigid mounting for the sealing device.

Because of whipping or other eccentric movement or shifting of a shaft, a cushioned or somewhat yieldable association of the sealing device with respect to a related machine element is considered desirable; but ordinarily such prior structures would not yield such a desirable cushion mounting.

Also, where such a sealing device has a cylindrical reaction ring, the flowing of the moldable material during the molding of the device may not be sufficiently free and the force with which the moldable material presses upon the reaction ring during molding may not be sufficiently great to bring about a firm bonding effect between the molded rubber and the reaction ring to assure that those two parts will remain firmly bonded together throughout the period of usage of the device.

An important object of the present invention is the provision of a sealing device employing a reaction ring which is of such shape that the body of rubber extending therearound may be of such substantial radial thickness that the device, in use, is cushionedly, rather than rigidly, held in fixed association with one of the machine elements.

Another important object of this invention is the provision of a sealing device having a reaction ring which is of such a shape that, during the molding of the device, the moldable rubber material may flow freely around the reaction ring, and the ring presents a very substantial surface area extending transversely to the general direction of movement of the moldable rubber material, thereby causing the rubber to be pressed firmly against the large surface area of the reaction ring and, in consequence, to be firmly bonded thereto.

Another important object is the provision of a sealing device having a reaction ring which is of such a shape that as the device is pushed into place, in or on a machine element, the frictional engagement of the rubber portion of the sealing device with a cylindrical surface of the machine element does not have the tendency of peeling the rubber away from the reaction ring. That tendency is present with respect to the mentioned prior devices but is obviated or greatly minimized in devices according to the present invention.

Another object of this invention is the provision of a sealing device having a reaction ring of such shape that, when the device is pushed into place in a machine, the rubber extending around the reaction ring occupies a wedge-shaped space so that its frictional engagement with the adjacent wall of a machine element causes the rubber to be wedged more firmly against the reaction ring and against such adjacent machine element surface, thereby enhancing the association of the rubber with the reaction ring and the sealing effectiveness of the rubber with respect to the adjacent machine element surface upon which the sealing device is fixedly mounted.

The foregoing and other objects are accomplished by the present invention of which several embodiments are illustrated in the accompanying drawings; it being understood, however, that such embodiments are merely illustrative and that the present invention is not limited thereto.

Figure 1 is a side view, partly in side elevation and partly in axial section, of an oil seal constituting a preferred embodiment of this invention shown in association with an opening in a machine casing and a shaft extending through said opening.

Fig. 2 is a side view, partly in side elevation and partly in axial section, of a rigid reaction ring which is utilized in the structure shown in Fig. 1.

Figs. 3 and 4, respectively, are of the same general character as Figs. 1 and 2, but illustrate a further embodiment of the invention.

Figs. 5 and 6, respectively, are also of the same general character as Figs. 1 and 2, but illustrate still another embodiment of the invention.

Referring first to Figs. 1 and 2, the sealing device comprises a sealing member 11 of relatively soft, resilient, molded rubber. This member is formed with a mounting portion 12, having an outer cylindrical surface 13, which snugly engages an inner cylindrical surface 14, defining an opening 15 in a machine casing 16. The sealing member 11 also includes an integral, radially inwardly extending web 17 which leads into and continues radially inwardly and axially as a frusto-conical sealing flange 18. The free end of the flange 18 is formed with an annular sealing lip 19 which, before installation in the machine, has a smaller central opening than a shaft 20 with which it is to be associated as may be understood from the broken line showing of the size and shape of the sealing lip in its unstressed form at 19a. When the sealing device is pressed over the shaft upon being installed in a machine the sealing lip 19 spreads open to some extent and the reaction of this spreading causes the lip to firmly engage the exterior of the shaft. This engagement is in the nature of a running seal engagement between the sealing lip and the shaft and it may be enhanced, if desired, by providing a contractile garter coil spring 21 disposed in a position encircling the sealing flange 18 within an annular groove 22 formed in the outer surface of the latter.

The sealing device also includes a rigid reaction ring 23 which, by the use of any suitable molding and bonding technique, may be integrally associated with and bonded to the sealing member 11 simultaneously with the molding of the latter.

The reaction ring 23 preferably is curvilinearly tapered and, more particularly, as employed in the embodiment now being described, the reaction ring is formed of metal or other suitable stiff material of substantially uniform thickness and, as viewed in axial section, as shown in the upper portions of Figs. 1 and 2, the ring is curved outwardly from its one end to its other end; this curvature being such that the outer surface of the reaction ring is concave as indicated at 24.

The reaction ring 23 extends about the inner surface of the mounting portion 12 so that a very considerable axially extending part of the mounting portion is disposed in radial alignment with the reaction ring and between the latter and the inner cylindrical surface 14 of the machine casing.

Ordinarily, such a sealing device would be molded with the outside diameter of the mounting portion 12 somewhat greater than the diameter of the inner cylindrical surface 14 of the machine casing and, when the device is pushed axially onto the shaft 20 and into the machine casing opening 15, the mounting portion 12 is deformed radially and is squeezed tightly between the reaction ring 23 and the inner cylindrical surface 14 of the machine casing. This squeezing of the mounting portion 12 causes a reaction of the rubber of the mounting portion which is effective therein in a radial direction, thereby causing a very strong pressure engagement between the mounting portion 12 and the cylindrical surface 14 of the machine casing.

As the device is molded to an over-all diameter somewhat greater than the diameter of the inner cylindrical surface 14 of the machine casing, it is apparent that the reaction within the rubber constituting the mounting portion 12 resulting from the forcing of the device into the machine casing opening 15 would be substantially uniform at all points along the axial dimension of the reaction ring 23. However, because of the curvilinear taper of the reaction ring 23 and the complemental wedge shape of the mounting portion 12, it may be understood that the mentioned reaction which takes place toward the right end of the reaction ring as viewed in Fig. 1, would cause a more forceful engagement of the mounting portion 12 with the cylindrical surface 14 toward the mentioned right end of the device than toward the left end thereof. This results because of the fact that toward the left end of the device there is a greater thickness of rubber to absorb the reaction and hence a relatively lesser portion of the reaction operates at the left end of the device for the purpose of holding the device in place in the machine.

Because of this lesser effect of the reaction toward the left end of the device, and the greater thickness of rubber in the mounting portion 12 toward that end, the sealing device is held with a very adequate cushioning effect within the machine casing; and because of being so cushioned, the device as a whole is capable of some slight radial shifting or vibration to compensate for any whipping or other eccentric movements of the shaft. This cushioning effect is not present to any material extent in earlier structures in which the portion corresponding to the mounting portion 12 would be relatively thin and of substantially uniform thickness throughout.

In addition to the hereinbefore described advantages derived from this invention in connection with its operation, it is noteworthy that the use of a curvilinearly tapered reaction ring facilitates the molding of the device and more particularly the bonding of the sealing member to the reaction ring. In molding these devices it is customary to place the reaction ring in the bottom of a horizontally disposed lower mold member and then to place a biscuit or blank of uncured rubber material in the mold and on top of the reaction ring. Then, an upper mold member of suitable shape is pressed downwardly upon the blank and the blank material thus is pressed to the desired cross-sectional shape substantially as indicated in Fig. 1; although the outside diameter of the molded parts, as already explained, would be somewhat greater than shown in said figure and the sealing flange 18 and the sealing lip 19 would extend inwardly approximately as shown in broken lines in said figure.

As the upper mold portion is moved downwardly, the rubber blank material is thrust downwardly or, i. e., in an axial direction as viewed in Fig. 1 and as this thrust takes place the rubber material is thrust firmly against the outside concave surface 24 of the reaction ring. This direct thrust of the blank material against the relatively large concave area of the reaction ring together with the pressure developed in the blank material during the molding operation assures a very effective bonding of the rubber to the reaction ring. In earlier structures, in which a cylindrical reaction ring is employed, the mentioned axial thrust of the blank material would be effective only against a relatively narrow end edge of the reaction ring, so that the axial thrust would not aid materially in bonding the rubber to the said ring.

The embodiment illustrated in Figs. 3 and 4 differs from that already described with reference to Figs. 1 and 2 principally in that the curvilinearly tapered reaction ring 23a has a generally convex outer surface at 25 instead of the concave surface 24 of the first described embodiment and in that no garter spring is employed. In this embodiment the sealing flange 18a is somewhat differently formed in cross-section and somewhat thickened because of the omission of the garter spring.

In contrast to the first two described embodiments illustrated in Figs. 1-4 inclusive, the embodiment illustrated in Figs. 5 and 6 is formed and designed to be fixedly applied upon and to turn with the shaft 20. This embodiment is substantially the reverse of the first described embodiment illustrated in Figs. 1 and 2, but omits the garter spring 21. In the embodiment of Figs. 5 and 6 the curvilinearly tapered reaction ring 23x has a concave inner surface and the mounting portion 12x is wedge-shaped complementally to the mentioned concave surface.

The sealing flange 18x extends radially outwardly and axially into running seal engagement with the inner cylindrical surface 14 of the machine casing. If desired, this embodiment may be further modified by disposing an expansive member such as a circular coil spring about the inner surface of the sealing flange 18x to urge the latter outwardly and thus enhance the running seal engagement of the latter with the cylindrical surface 14 of the machine casing.

As a matter of fact it will be understood by those conversant with this art that the garter springs are entirely optional and the determination as to whether or not they are to be employed will depend upon the particular use for which a given oil seal is intended.

It should also be obvious that the present inventive concept may be utilized in various structures other than those shown and described herein without, however, departing from the invention as set forth in the following claims:

What we claim is:

1. A sealing device for sealing an annular space between two relatively movable machine elements having opposed cylindrical surfaces defining said space, comprising a molded sealing element of resilient, rubber-like material, having an annular mounting portion with a cylindrical surface adapted to tightly engage one of said opposed cylindrical machine surfaces to hold the device fixed thereto, and an annular sealing portion adapted to slidably engage and effect a sliding seal with the other of said opposed cylindrical machine surfaces, and a relatively rigid reaction ring having an annular surface which is curvilinearly tapered relatively to the axis of the device substantially from end to end of said ring and bonded to said mounting portion in spaced relation to and in radial alignment with the mounting portion's mentioned cylindrical surface; said tapered surface having a first portion toward one end thereof which closely approaches parallelism to said cylindrical surface and a second portion the curvature of which extends uninterruptedly from said first portion substantially to the other end of said ring and which, toward the latter end, is at a substantial angle relatively to the device's axis.

2. A sealing device according to claim 1, the concave side of said curvilinearly tapered surface facing the mentioned cylindrical surface of said mounting portion.

3. A sealing device according to claim 1, the convex side of said curvilinearly tapered surface facing the mentioned cylindrical surface of said mounting portion.

EDWARD W. FISHER, Jr.
ALBERT M. CHAMBERS, Jr.

References Cited in the file of this patent

UNITED STATES PATENTS

| Number | Name | Date |
| --- | --- | --- |
| 2,172,325 | Victor et al. | Sept. 5, 1939 |
| 2,417,390 | Winkeljohn | Mar. 11, 1947 |

FOREIGN PATENTS

| Number | Country | Date |
| --- | --- | --- |
| 479,743 | Great Britain | of 1938 |